(12) United States Patent
Wohlfahrt et al.

(10) Patent No.: US 7,911,356 B2
(45) Date of Patent: Mar. 22, 2011

(54) RAIN SENSOR

(75) Inventors: Karl-Heinz Wohlfahrt, Bodman-Ludwigshafen (DE); Thomas Ebner, Radolfzell (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 627 days.

(21) Appl. No.: 11/985,004

(22) Filed: Nov. 13, 2007

(65) Prior Publication Data

US 2008/0117074 A1 May 22, 2008

(30) Foreign Application Priority Data

Nov. 13, 2006 (DE) ................... 20 2006 017 362 U

(51) Int. Cl.
*G08B 23/00* (2006.01)

(52) U.S. Cl. ...................... 340/693.9; 248/674

(58) Field of Classification Search ............ 340/693.5, 340/693.9; 248/674
See application file for complete search history.

(56) References Cited

U.S. PATENT DOCUMENTS

| | | | | |
|---|---|---|---|---|
| 3,900,795 | A * | 8/1975 | Larsen et al. ................. | 324/537 |
| 4,871,917 | A * | 10/1989 | O'Farrell et al. ............ | 250/341.7 |
| 4,987,296 | A * | 1/1991 | Kajioka et al. ............. | 250/222.1 |
| 5,572,017 | A * | 11/1996 | Veltum et al. ............. | 250/227.25 |
| 5,710,633 | A | 1/1998 | Klappenbach et al. | |
| 6,507,015 | B1 * | 1/2003 | Maeno et al. ............ | 250/227.25 |
| 6,581,484 | B1 | 6/2003 | Schuler | |
| 6,744,371 | B1 * | 6/2004 | Schmitt et al. ............... | 340/602 |
| 6,894,619 | B1 * | 5/2005 | Schmitt et al. ............... | 340/604 |
| 6,995,354 | B2 * | 2/2006 | Hagen et al. ............ | 250/227.25 |
| 7,297,932 | B2 * | 11/2007 | Georgiadis et al. ...... | 250/227.25 |
| 7,658,101 | B2 * | 2/2010 | Gotoh et al. .............. | 73/170.17 |
| 2004/0020285 | A1 * | 2/2004 | Schneider ................. | 73/170.17 |
| 2004/0242285 | A1 * | 12/2004 | Farshi ........................ | 455/569.2 |
| 2006/0076477 | A1 | 4/2006 | Ishikawa | |
| 2006/0113397 | A1 * | 6/2006 | Beilenhoff et al. ........... | 235/494 |
| 2007/0205348 | A1 * | 9/2007 | Schmitt et al. ................ | 248/503 |

FOREIGN PATENT DOCUMENTS

| | | |
|---|---|---|
| CN | 1361734 | 7/2002 |
| DE | 4410217 | 9/1995 |
| DE | 19804165 | 2/1999 |
| DE | 19933640 | 2/2001 |
| DE | 10326855 | 12/2004 |
| DE | 29924838 | 2/2006 |
| DE | 102005046142 | 4/2006 |
| DE | 102005015973 | 10/2006 |
| EP | 1486388 | 12/2004 |

* cited by examiner

*Primary Examiner* — George A Bugg
*Assistant Examiner* — Naomi Small
(74) *Attorney, Agent, or Firm* — Tarolli, Sundheim, Covell & Tummino LLP

(57) ABSTRACT

A rain sensor is provided for fastening on an inner side of a windscreen of a motor vehicle. The rain sensor includes a holding frame for fastening to the inner side of the windscreen, a sensor element, a housing part for housing the sensor element such that the sensor element is arranged in the housing part, and a holding device for engaging the holding frame, the holding device being fastened to the housing part, wherein the holding device is brought into engagement with the holding frame in a pre-mounted state, and the holding device presses the housing part with the sensor element onto the windscreen in a final mounted state.

16 Claims, 6 Drawing Sheets

RAIN SENSOR

FIELD OF THE INVENTION

The invention relates to a rain sensor for fastening on an inner side of a windscreen of a motor vehicle with a holding frame for fastening on the inner side of the windscreen, a sensor element, a housing part in which the sensor element is arranged, and a holding device.

BACKGROUND OF THE INVENTION

Rain sensors are known which detect the presence of raindrops on the windscreen of a motor vehicle and therefore make possible an automatic activation of the windscreen wipers. Mounting on the windscreen constitutes a problem here, because no reflections must occur between the sensor element and the windscreen. A gap, and equally an adhesive layer, are therefore to be avoided on the optical path.

It is known to stick a holding frame to the windscreen and to fasten the sensor element, which is incorporated into a housing part, to the holding frame by means of a holding device so that the housing part is pressed with the sensor element onto the windscreen. The holding device is constructed for example as a spring which engages over the housing part and has to be pressed under grooves. It is known in addition to push two laterally mounted springs under projecting pins. The springs must provide the engagement and apply the tension at the same time.

SUMMARY OF THE INVENTION

The rain sensor according to the invention has a holding device in which the components can be optimized separately for the functions of engaging and bracing. A secure mounting is thereby achieved with low production costs.

The present invention provides a rain sensor according to claims 1, 4 and 7, which comprises a holding device for achieving this, in which the mounting takes place in two steps and therefore firstly the holding device, fastened to the housing part, is brought into engagement with the holding frame without force, and in a second final mounting step the housing part is pressed with the sensor element onto the windscreen. Additional advantageous aspects of the invention will be apparent from the dependent claims.

DETAILED DESCRIPTION OF THE INVENTION

Figure 1:
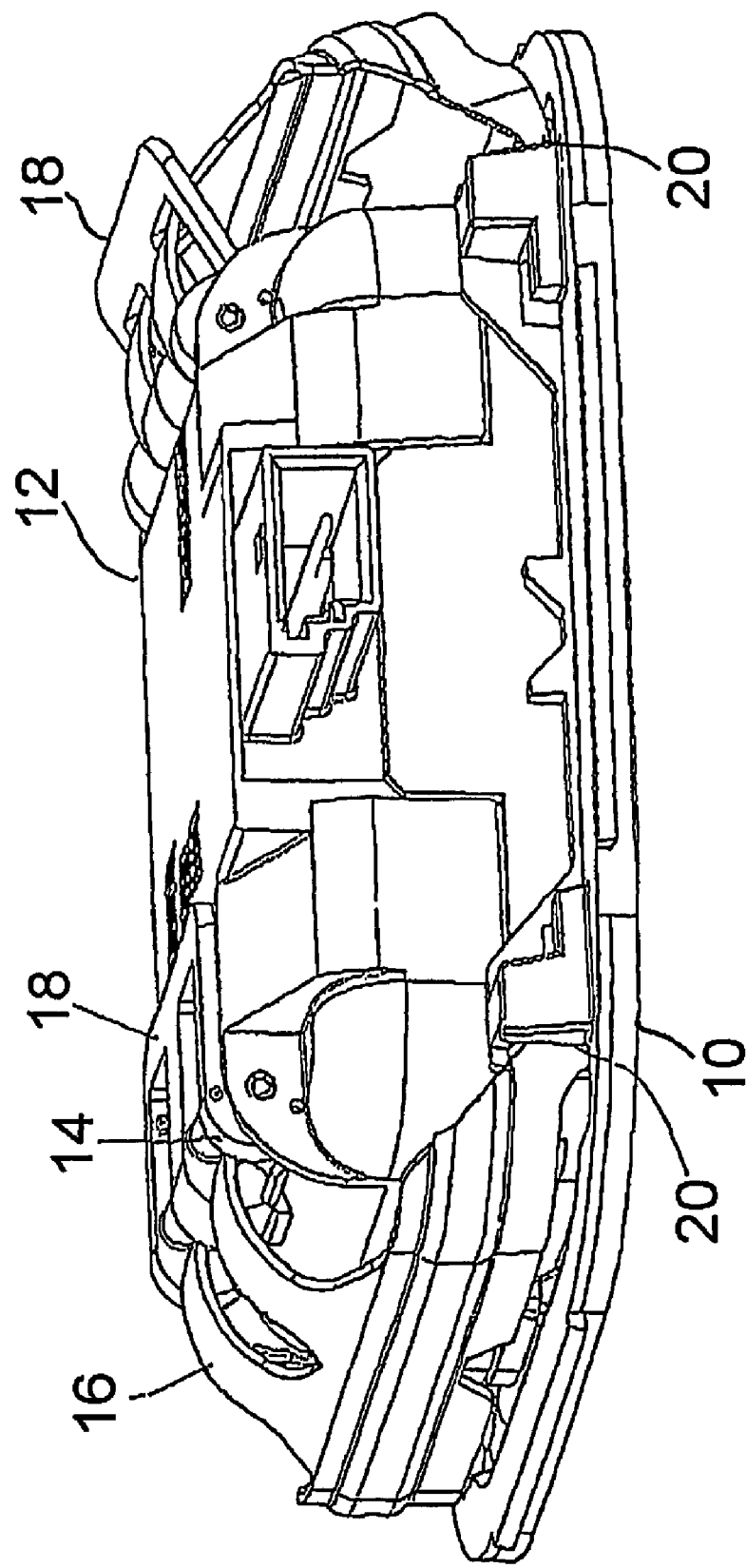
FIGS. 1 to 3 show a rain sensor according to a first embodiment of the invention.
Figure 2:
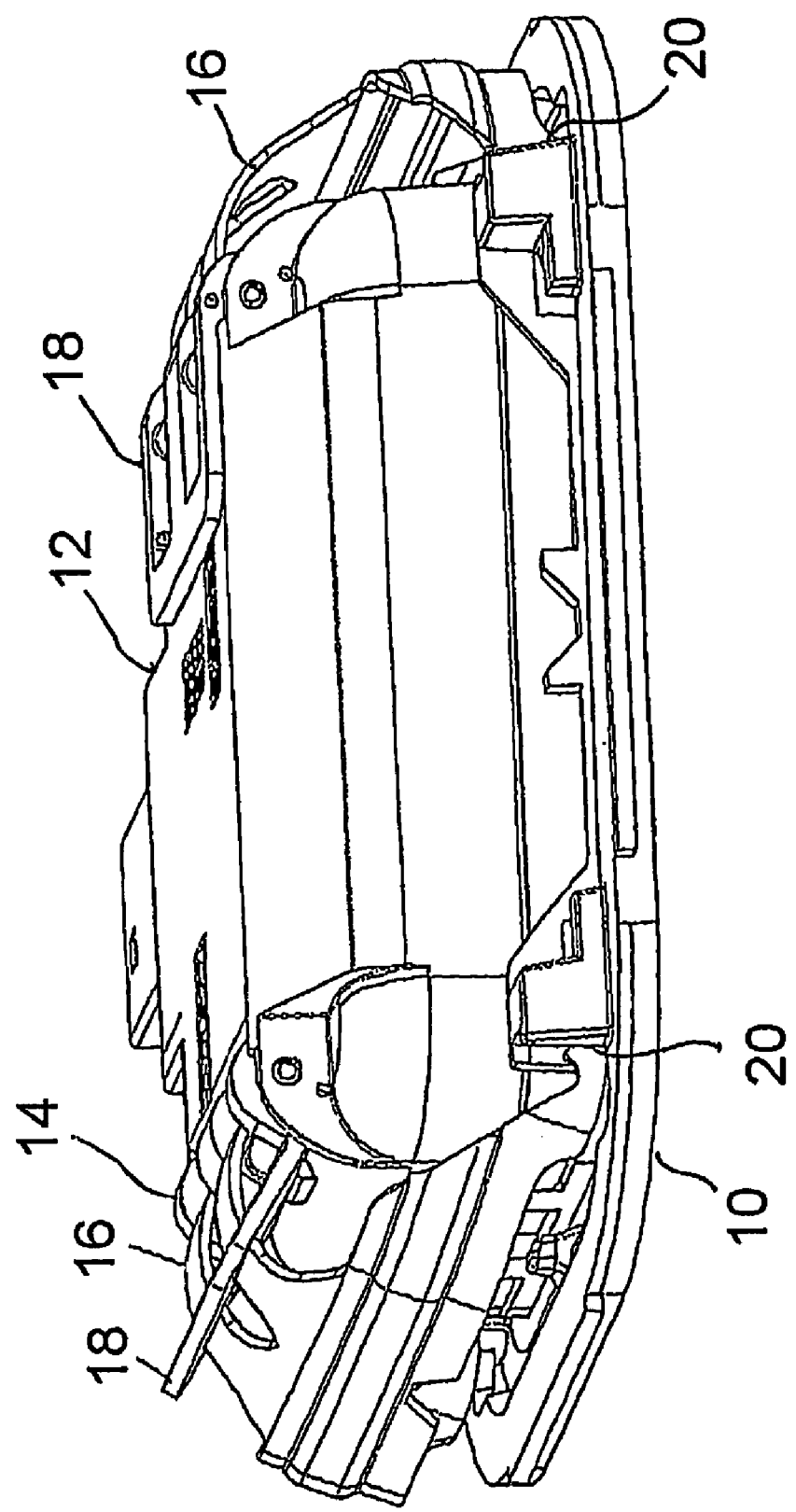
Figure 3:
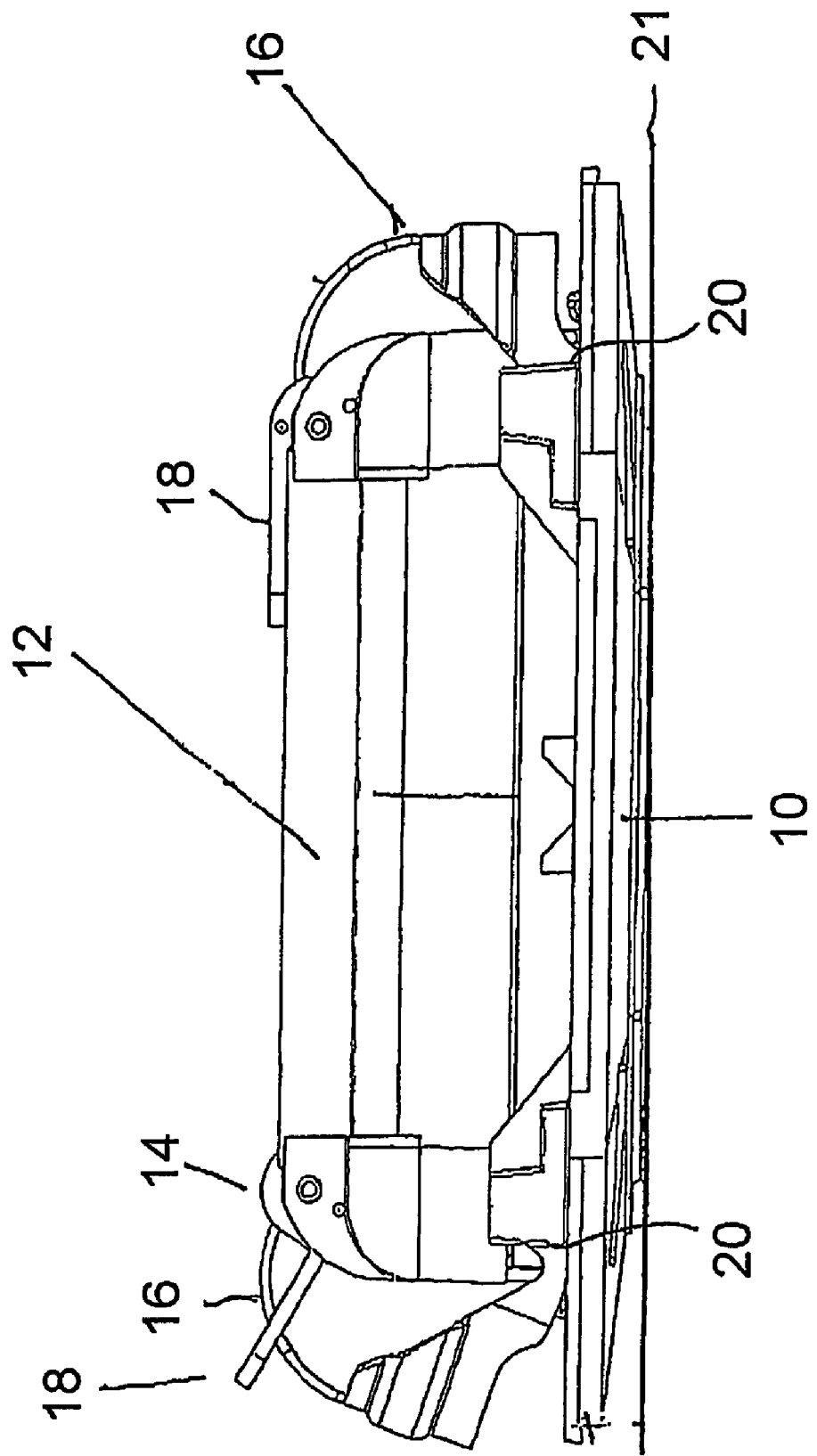

FIGS. 1 to 3 show a rain sensor for mounting on a windscreen (shown schematically in all of the figures as line 21) of a motor vehicle, for example. The rain sensor, which can be fastened on the inner side of the windscreen 21 has a generally parallelepiped shaped housing part 12, which is adapted to house a sensor element such that the sensor element is arranged in the housing part 12. A generally flat rectangular mounting frame 10 is provided for attachment to the inner side of the windscreen 21 and defines a recess for accommodating the housing part 12. Two fastening devices are attached to the housing part 12 on each of its short sides so that the fastening devices generally oppose each other on the housing part 12. Each fastening device is provided with a lever 18, which is pivotally mounted about an axis extending along a short side of the housing part 12 and a resilient bracket 16, which has one of its ends pivotally connected to the lever 18 at an eccentric portion 14 of the lever 18 so that it is eccentric to the axis about which the lever 18 is pivotally mounted. The other end of the bracket 16 is formed as an engagement member, which has two projecting portions. The bracket 16 may be formed of any suitable resilient sheet material, for example spring steel. Two engagement portions 20 are provided on the mounting frame 10 and define recesses arranged generally at the corners of each of the short sides of the mounting frame 10. The engagement portions 20 on the mounting frame 10 correspond to the engagement members formed by the bracket 16 of each fastening device so that the engagement members of the fastening devices are adapted to cooperate with the engagement portions 20 of the mounting frame 10.

FIG. 1 shows on the left the final mounted state of the holding device and, for the holding device on the right-hand side, the pre-mounted state, whilst FIG. 2 shows on the right the final mounted state and, for the holding device on the left-hand side, the pre-mounted state. During pre-mounting, no tension occurs between the engagement members of the bracket 16 (fastening device) and the engagement portions 20 of the holding frame 10 so that the engagement members of the bracket 16 and the engagement portions 20 of the holding frame are only loosely engaged with each other. The lever 18 is in a first pivotal position so that it is held away from the top surface of the housing part 12 (on the right hand side of FIG. 1 and the left hand side of FIGS. 2 and 3 the lever 18 is shown as sticking up at an angle from the surface of the housing part 12 in the pre-mounted state). The final mounting of the sensor onto the windscreen 21 takes place by a simple pivotal movement of each lever 18 about its mounting axis defined in the housing part 12 so that each bracket 16 undergoes an eccentric movement about this axis and each lever 18 then lies flat against the top surface of the housing part 12 in a second pivotal position. This causes the first end of each bracket 16 (the end that is pivotally connected to the lever 18) to move away from the windscreen 21 and each bracket to be tensioned, which urges the housing part 12 towards the windscreen 21. The engagement members of each fastening device provided at the other end of each bracket 16 are then brought into tension with the engagement portions 20 of the mounting frame 10. This means that the housing part 12 of the sensor is urged into cooperation with the holding frame 10, and thus towards the windscreen 21.

Figure 4:
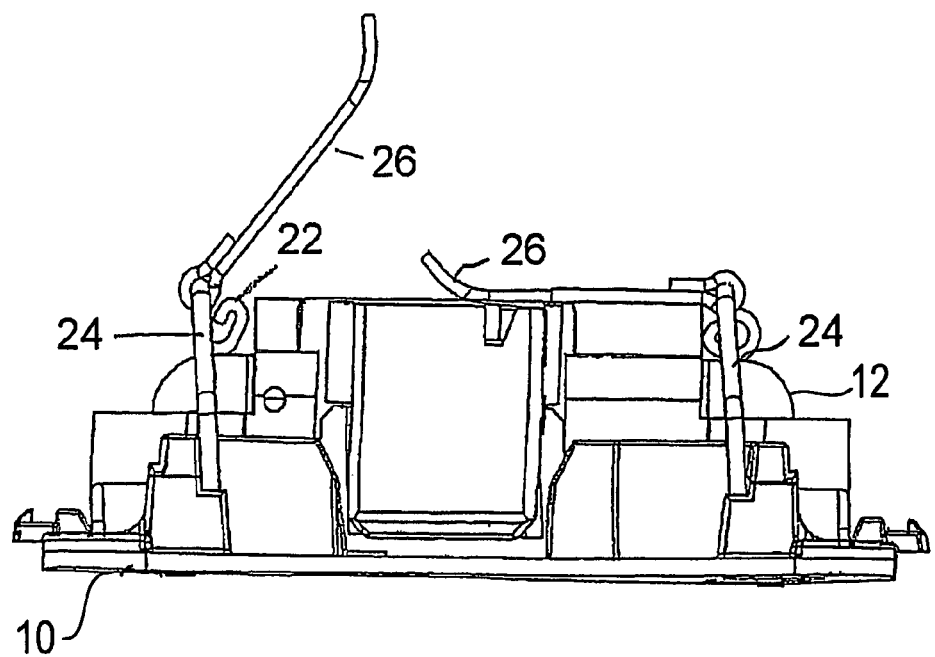
FIGS. 4 to 6 show a rain sensor according to a second embodiment of the invention.
Figure 5:
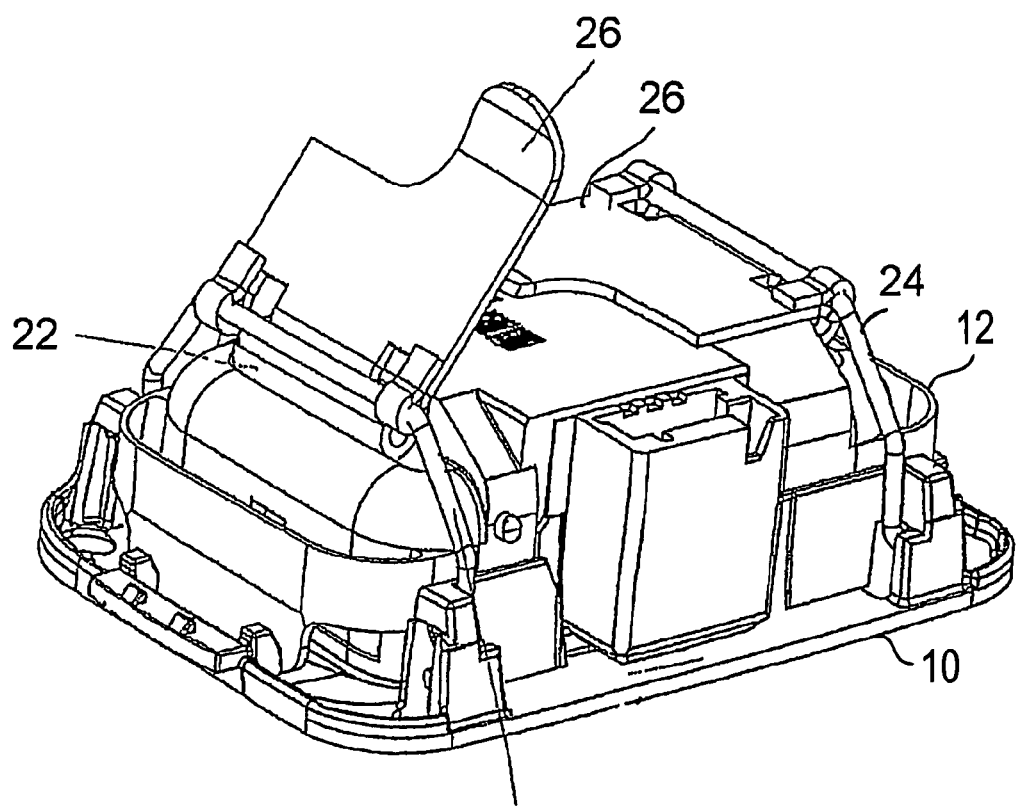
Figure 6:
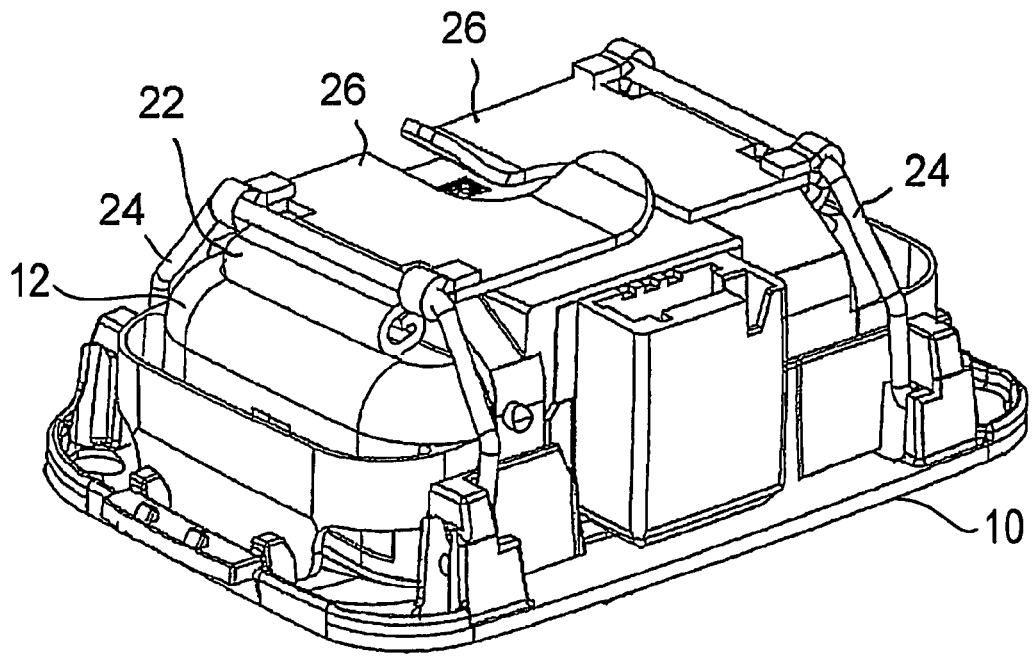

FIGS. 4 to 6 show a rain sensor in a second embodiment with a fastening device attached to each of the short sides of a generally parallelepiped shaped housing part. The housing part 12 is adapted to house a sensor element such that the sensor element is arranged in the housing part 12. A generally flat rectangular mounting frame 10 is provided for attachment to the inner side of a windscreen 21 and defines a recess for accommodating the housing part 12. Each fastening device provided on the housing part 12 is adapted to fasten the housing part 12 to the mounting frame 10 and comprises a rigid bracket 24 defining engagement arms at each end and having a generally straight, elongate centre portion intermediate the engagement arms defining an axis about which a lever 26 is pivotally mounted. In this embodiment, each lever 26 is hinged at one end about the centre portion of one bracket 24. Each lever 26 has a generally flat, rectangular shape, but at the end of each lever 26 that is not hinged, there is a projecting portion that curves up slightly away from the housing part 12 to form a flange. When both levers 26 are flat on the top surface of the housing part 12, when the sensor is in its mounted position, the levers 26 cover almost all of the top surface of the housing part and the projecting portions of each lever 26 are accommodated by a recess formed by the part of the other lever 26 that does not project. The flanges make it easier for a user to grip the levers 26 during mounting and removal of the sensor from the windscreen. A resilient eccentric cam 22 is attached to each lever 26 at the hinged end and is configured to exert a mounting force substantially parallel to the windscreen 21 when the sensor is mounted onto the windscreen. The end of each engagement arm of the brackets 24 is adapted to be accommodated in a recess defined by corresponding engagement portions of the mounting frame.

In FIGS. 4 and 5, the pre-mounted state is shown on the left and respectively the final mounted state is shown on the right. Here, also, the final mounting takes place by a simple pivotal movement of the levers 26 about the brackets, in a similar way as described in the previous embodiment, with a force being exerted primarily parallel to the windscreen. In the pre-mounted state, the planes of the levers 26 are arranged at an angle to the top surface of the housing part 12, in a first pivotal position and the engagement arms at the ends of each bracket 24 are only loosely accommodated in the corresponding engagement portions of the mounting frame 10. To mount the sensor on the windscreen 21 so that the sensor is in its mounted configuration shown in FIG. 6, the levers 26 are pushed downwards so that they are pivoted towards the top surface of the housing part 12 and lie flat on top of the housing part 12 in a second pivotal position. This pushes the engagement arms of the brackets 24 into the engagement portions of the mounting frame 10 so that there is a tension between the engagement arms and the engagement portions. The eccentric cams 22 are then pushed onto the top surface of the housing part 12 so that they abut the housing part and exert a force substantially parallel to the windscreen 21, which urges the housing part 12 towards the windscreen 21 and into cooperation with the mounting frame 10 so that the sensor is mounted on the windscreen 21.

Figure 7:
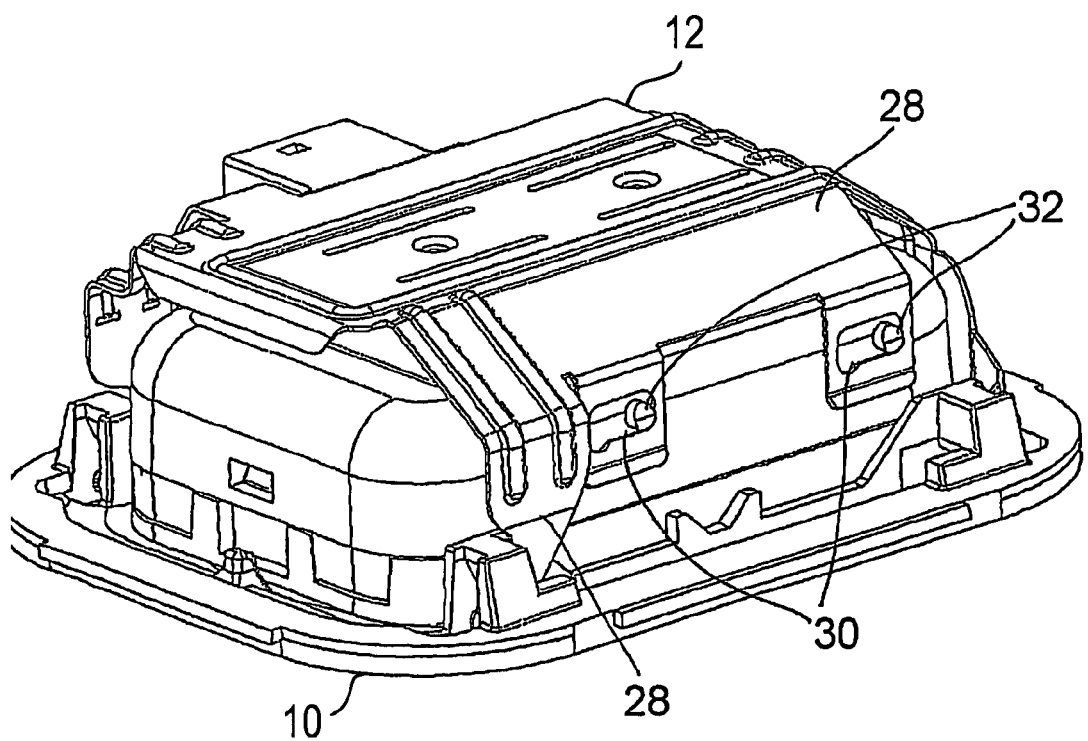
FIGS. 7 to 9 show a rain sensor according to a third embodiment of the invention.
Figure 8:
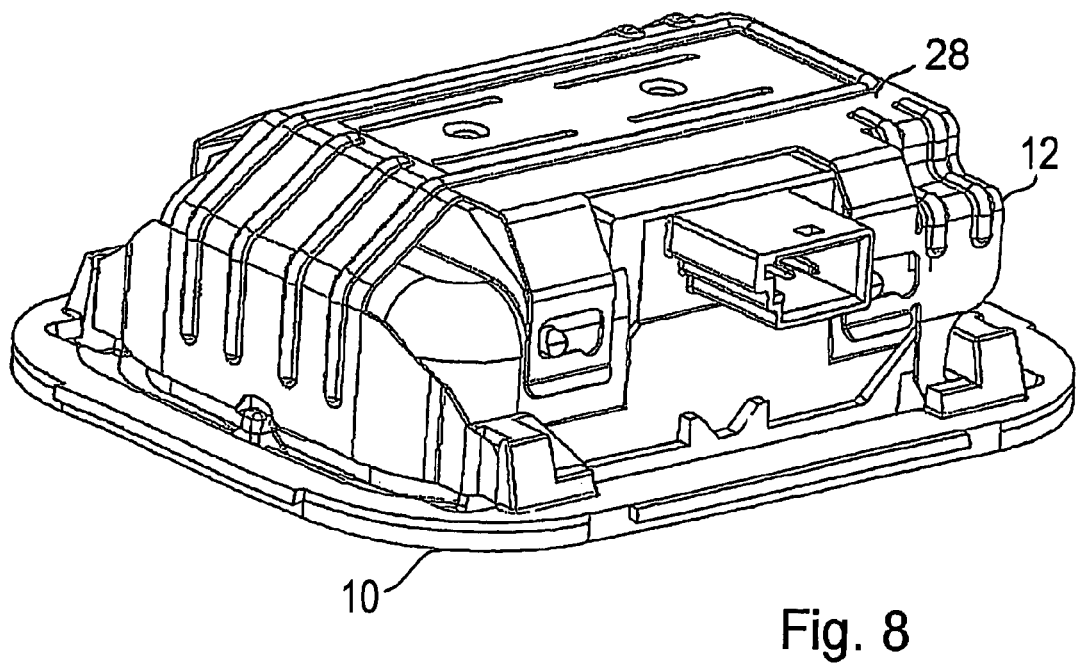
Figure 9:
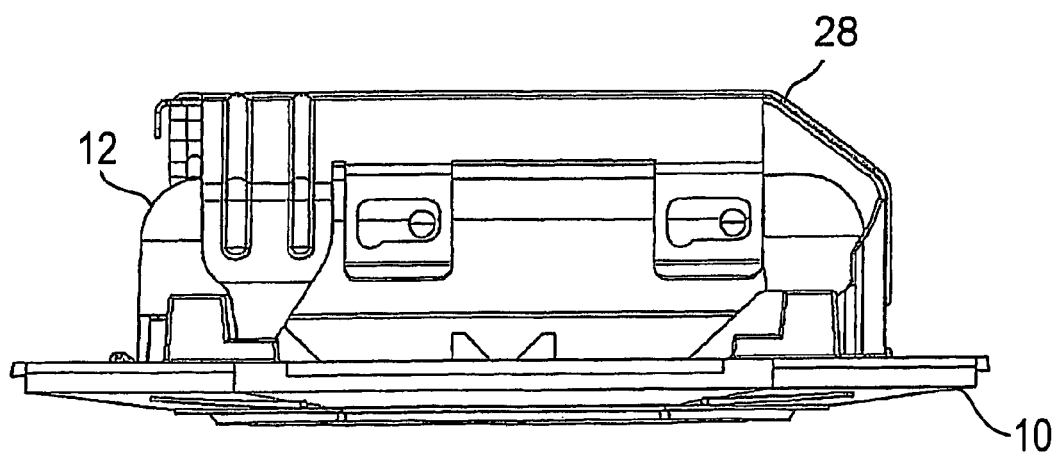

FIGS. 7 to 9 show a rain sensor according to a third embodiment of the invention for fastening to the inner side of a motor vehicle windscreen 21. A sensor element is housed in a generally parallelepiped shaped housing part 12 so that the sensor element is arranged within the housing part 12. A generally flat rectangular mounting frame 10 is adapted to be attached to an inner side of the windscreen 21 and defines a recess for accommodating the housing part 12. The housing part 12 is provided with a fastening device that is adapted to fasten the housing part 12 onto the mounting frame 10. The fastening device has a resilient bracket 28, which is pre-assembled with the housing part 12 before the housing part 12 is brought into cooperation with the mounting frame 10. The bracket 28 has a flat main body adapted to contact a flat top wall of the housing part 12 (the side of the housing part 12 adapted to be furthest away from the windscreen 21 when the sensor is in its final mounted position on the windscreen 21) and side wings, which are each provided with an elongate slot 30 formed as a cutout in each of the side wings. Pins are provided on the long side faces of the housing part 12 such that each pin is adapted to loosely engage with a corresponding elongate slot when the housing part 12 and the bracket are pre-assembled. This allows the housing part 12 and the bracket 28 to be held together in their pre-assembled position. The bracket 28 also has engagement arms projecting downwardly of its flat top surface so that one engagement arm is arranged generally at each corner of the housing part 12 on its bottom surface opposite the top wall when the bracket 28 and the housing part 12 are pre-assembled. The mounting frame 10 has engagement portions arranged generally at each corner, which define recesses for receiving a corresponding engagement arm of the bracket 28.

For mounting the rain sensor to the windscreen 21, the housing part 12, which has been pre-assembled with the bracket 28, is seated on the mounting frame 10 in the recess provided for accommodating the mounting frame 10. The bracket 28 is urged against the housing part 12 by exerting a downward force (perpendicular to the surface of the windscreen 21) on the flat main body of the bracket 28 and the engagement arms of the bracket 28 are then inserted to the corresponding engagement portions of the mounting frame 10, so that the engagement arms cooperate with the engagement portions. This in turn causes the housing part to be urged towards the mounting frame 10, and thus towards the windscreen 21. Then the force on the bracket 28 is released. Since the bracket 28 is made of a resilient material, it is left resiliently deformed when the force on it is released. This resilient deformation of the bracket 28 leaves the housing part 12 urged towards the windscreen 21, which fastens the rain sensor in place on the windscreen 21.

What is claimed is:

1. A rain sensor for fastening on an inner side of a windscreen of a motor vehicle, comprising:
    a sensor;
    a housing part for housing the sensor such that the sensor element is arranged in the housing part;
    a mounting frame for attachment to the inner side of the windscreen and having an accommodation for said housing part;
    at least one fastening device for fastening the housing part on said mounting frame;
    said fastening device comprising;
    a lever pivotally mounted about an axis on the housing part, and a bracket that has a first end pivotally connected to said lever in eccentric relation to said axis and a second end formed as an engagement member for engagement with cooperating engagement members on said mounting frame, wherein:
    in a pre-mounted state the engagement members of the bracket and of the mounting frame are loosely engaged with each other while the lever is in a first pivotal position and, in a final mounted state, the lever is in a second pivotal position thereby moving away the first end of the bracket from the windscreen and tensioning said bracket so as to urge the housing part towards the windscreen.

2. The rain sensor according to claim 1, wherein the bracket is made from a resilient sheet material such as spring steel.

3. The rain sensor according to claim 1, wherein the housing part is generally of a parallelepiped shape and has a fastening device on each of its short sides.

4. A rain sensor for fastening on an inner side of a windscreen of a motor vehicle, comprising:
    a sensor;
    a housing part for housing the sensor such that the sensor element is arranged in the housing part;
    a mounting frame for attachment to the inner side of the windscreen and having an accommodation for said housing part;
    at least one fastening device for fastening the housing part on said mounting frame;
    said fastening device comprising:

a bracket with a pair of engagement arms for engagement with cooperating engagement members on the mounting frame;

a lever pivotally mounted on said bracket intermediate the engagement arms;

and an eccentric cam attached to said lever; wherein:

in a pre-mounted state the engagement arms of the bracket are loosely engaged with the engagement members of the mounting frame while the lever is in a first pivotal position and, in a final mounted state, the lever is in a second pivotal position thereby in which the eccentric cam abuts the housing part so as to urge the housing part towards the windscreen.

5. The rain sensor according to claim 4, wherein the bracket is rigid and the cam is resilient.

6. The rain sensor according to claim 4, wherein the housing part is generally of a parallelepiped shape and has a fastening device on each of its short sides.

7. A rain sensor for fastening on an inner side of a windscreen of a motor vehicle, comprising:

a sensor;

a housing part for housing the sensor such that the sensor element is arranged in the housing part;

a mounting frame for attachment to the inner side of the windscreen and having an accommodation for said housing part;

a fastening device for fastening the housing part on said mounting frame;

said fastening device comprising:

a resilient bracket with a flat main body and a plurality of engagement arms for engagement with cooperating engagement members on the mounting frame; wherein:

in a first mounting step the bracket is pre-assembled with the housing part so that the main body of the bracket contacts a flat top wall of the housing part, in a second mounting step the housing part is seated on the mounting frame and in third mounting step the engagement arms are engaged with the cooperating engagement members of the mounting frame while the bracket is urge against the housing part and in a final mounting step the bracket is released thereby leaving the housing part urged towards the windscreen by resilient deformation of the bracket.

8. The rain sensor according to claim 7, wherein the bracket has side wings each with an elongate slot in which a pin on a side wall of the housing part engages loosely in the preassembled condition of the housing part and the bracket.

9. The rain sensor according to claim 4, wherein said at least one fastening device comprises a pair of fastening devices that cooperate to substantially cover a top surface of said housing part facing away from said mounting frame.

10. The rain sensor according to claim 9, wherein the bracket pivots in a first direction relative to the axis into cooperating engagement with the engagement members on the mounting frame, the lever pivoting in a second, opposite direction relative to the axis into the second pivotal position.

11. The rain sensor according to claim 1, wherein in the first pivotal position the lever has a first end pivotally mounted to the housing part and a second end spaced from the housing part.

12. The rain sensor according to claim 1, wherein the lever lies flat against the top of the housing part when the lever is in the second pivotal position.

13. The rain sensor according to claim 4, wherein in the first pivotal position the lever has a first end pivotally mounted to the bracket and a second end spaced from the housing.

14. The rain sensor according to claim 4, wherein the at least one fastening device comprises first and second fastening devices that cooperate to substantially cover a top surface of the housing part facing away from the mounting frame when the lever is in the second pivotal position.

15. The rain sensor according to claim 14, wherein the lever of each fastening device includes a projecting portion and a recess, the projecting portion of each lever being accommodated in the recess of each other lever when the lever is in the second pivotal position.

16. The rain sensor according to claim 4, wherein the lever lies flat against the top of the housing part when the lever is in the second pivotal position.

\* \* \* \* \*